US010705594B2

(12) United States Patent
Srivastava (10) Patent No.: US 10,705,594 B2
(45) Date of Patent: Jul. 7, 2020

(54) POWER MANAGEMENT SYSTEM

(71) Applicant: INTEL CORPORATION, Santa Clara, CA (US)

(72) Inventor: Amit Kumar Srivastava, Kampung Jawa Penang (MY)

(73) Assignee: INTEL CORPROATION, Santa Clara, CA (US)

( * ) Notice: Subject to any disclaimer, the term of this patent is extended or adjusted under 35 U.S.C. 154(b) by 134 days.

(21) Appl. No.: 15/776,777

(22) PCT Filed: Nov. 1, 2016

(86) PCT No.: PCT/US2016/059933
§ 371 (c)(1),
(2) Date: May 16, 2018

(87) PCT Pub. No.: WO2017/112094
PCT Pub. Date: Jun. 29, 2017

(65) Prior Publication Data
US 2018/0335830 A1    Nov. 22, 2018

(30) Foreign Application Priority Data
Dec. 25, 2015   (MY) .............................. PI2015704764

(51) Int. Cl.
*G06F 1/3296* (2019.01)
*G06F 1/3234* (2019.01)
*G06F 13/42* (2006.01)

(52) U.S. Cl.
CPC ............ *G06F 1/3296* (2013.01); *G06F 1/325* (2013.01); *G06F 1/3253* (2013.01); *G06F 13/4282* (2013.01); *G06F 2213/0042* (2013.01)

(58) Field of Classification Search
CPC ...... G06F 1/3296; G06F 1/325; G06F 1/3253; G06F 13/4282
USPC .................................................. 713/320–324
See application file for complete search history.

(56) References Cited

U.S. PATENT DOCUMENTS 5,167,024 A * 11/1992 Smith .................. G06F 1/3203
                                                      713/322
5,987,617 A * 11/1999 Hu ............................ G06F 1/32
                                                      713/320
6,000,042 A * 12/1999 Henrie ...................... G06F 1/26
                                                      713/340

(Continued)

OTHER PUBLICATIONS

Korean IP Office—International Search Report of the International Searching Authority dated Feb. 2, 2017 for International Application No. PCT/US2016/059933 (3 pgs).

(Continued)

*Primary Examiner* — Paul R. Myers
(74) *Attorney, Agent, or Firm* — Womble Bond Dickinson (US) LLP (57) ABSTRACT

A Universal Serial Bus 2.0 (USB2 or eUSB2) device includes an integrated circuit (IC) having a physical layer to send and receive data on a pair of signal lines, a repeater communicatively coupled to the physical layer via the pair of signal lines, and having a port to send and receive data on a second pair of signal lines and a power management unit to provide power to the physical layer and the repeater during an active state and to gate power to the physical layer and the repeater during a low power state.

25 Claims, 6 Drawing Sheets

(56) References Cited

U.S. PATENT DOCUMENTS

| | | | | |
|---|---|---|---|---|
| 6,105,097 A * | 8/2000 | Larky | G06F 1/3215 710/314 |
| 6,119,194 A * | 9/2000 | Miranda | G06F 1/3203 710/306 |
| 6,272,644 B1 * | 8/2001 | Urade | G06F 1/3203 713/320 |
| 6,516,418 B1 * | 2/2003 | Lee | G06F 1/3203 713/320 |
| 6,584,519 B1 * | 6/2003 | Russell | G06F 13/4045 710/104 |
| 6,671,814 B1 * | 12/2003 | Kubo | G06F 1/3203 713/324 |
| 7,024,569 B1 * | 4/2006 | Wright | G06F 1/266 713/300 |
| 7,320,077 B2 * | 1/2008 | Kim | G06F 1/26 713/300 |
| 7,382,409 B2 | 6/2008 | Tateyama | |
| 7,392,409 B2 | 6/2008 | Tateyama | |
| 7,539,808 B2 * | 5/2009 | Kojima | G06F 1/266 710/302 |
| 8,046,600 B2 * | 10/2011 | Holle | G06F 1/189 713/300 |
| 8,527,798 B2 * | 9/2013 | Kastl | G06F 1/3203 713/324 |
| 2002/0162036 A1 * | 10/2002 | Kim | G06F 1/266 713/300 |
| 2006/0040715 A1 | 2/2006 | Chen et al. | |
| 2008/0168285 A1 * | 7/2008 | de Cesare | G06F 1/3203 713/320 |
| 2008/0320202 A1 | 12/2008 | Monks et al. | |
| 2014/0006662 A1 | 1/2014 | Chen et al. | |
| 2014/0047257 A1 * | 2/2014 | Masson | G06F 1/3253 713/324 |
| 2014/0149609 A1 | 5/2014 | Chan et al. | |
| 2015/0363350 A1 * | 12/2015 | Yeung | G06F 13/4221 710/106 |
| 2017/0286360 A1 * | 10/2017 | Srivastava | G06F 13/4295 |

OTHER PUBLICATIONS

Korean IP Office—Written Opinion of the International Searching Authority dated Feb. 2, 2017 for International Application No. PCT/US2016/059933 (10 pgs).

PCT/US2016/059933, International Preliminary Report and Written Opinion, dated Jul. 5, 2018, (12 pages).

\* cited by examiner

POWER MANAGEMENT SYSTEM

CROSS-REFERENCE TO RELATED APPLICATIONS

This patent application is a U.S. National Phase application under 35 U.S.C. § 371 of International Application No. PCT/US2016/059933, filed on 1 Nov. 2016, entitled POWER MANAGEMENT SYSTEM, which claims priority to Malaysian Patent Application No. PI2015704764 filed 25 Dec. 2015, the contents of which are incorporated by reference in their entirety.

FIELD

The present disclosure generally relates to power management; and more specifically to a low-power solution for Embedded Universal Serial Bus 2.0/Universal Serial Bus 2.0 (eUSB2/USB2).

BACKGROUND

USB is an industry protocol designed to standardize interfaces between computer devices for communication and supplying electrical power. The USB2 protocol has enjoyed widespread adoption in nearly every computing device, and has received tremendous support in terms of technology development with well-established standardized software infrastructure. The standard USB2 specification uses 3.3V analog signaling for communications between the two USB2 ports. The 3.3V signal strength tends to introduce integration challenges because some advanced semiconductor processes are moving towards a very low geometry leading to the gate oxide of a CMOS transistor no longer able to tolerate higher voltages, such as 3.3V. Embedded USB2 (eUSB2) provides a solution for future generation system on chip (SOC) designs in which a repeater handles high voltage operation during a classical speed mode of operation, and operates as a re-driver during high speed operation. eUSB2 defines a protocol for communication between the PHY and repeater based on the USB2 operation.

Power gating is a widely accepted technique for managing power. However, there are challenges in implementing power gating for a eUSB2 PHY and repeater. One problem is that power gating both the SOC and repeater results in a latency problem. Since both the SOC PHY and repeater need to perform a configuration Signaling (TbConfig) process to indicate a top down (host/device configuration) indication plus a SE1 Signaling referred as TSE1 process to make an announcement between the SOC PHY and Repeater. Aggressive Power gating will not be able to meet a 1 ms latency requirement during remote wake where the eUSB2 system (including repeater and Controller) needs to wake and reflect Resume-K within 1 ms). The impact of not power gating results in ~300 uW for 1× port and ~1.2 mW for 8× ports configuration.

Another challenge is presented when attempting to meet latency requirements during a lower power state. For instance, the SOC PHY is already in power gated mode, and the repeater is also in power gated mode, except wake on connect. In such instances the SOC eUSB2 PHY will suffer from back power (e.g., back current flow from the repeater to the SOC eUSB2 PHY) current during repeater periodically announcing a wake presence to check presence of the SOC eUSB2 PHY. This back power results in reliability issues. Finally, power gating the repeater will impact USB2 functionality, and is thus not a viable solution.

DETAILED DESCRIPTION

Embodiments described herein relate to a power management technique that provides for low power solution for embedded USB2 (eUSB2). In the following description, numerous specific details are set forth in order to provide a thorough understanding of various embodiments. However, various disclosed embodiments may be practiced without the specific details. In other instances, well-known methods, procedures, components, and circuits have not been described in detail so as not to obscure the particular embodiments of the invention.

Figure 1:
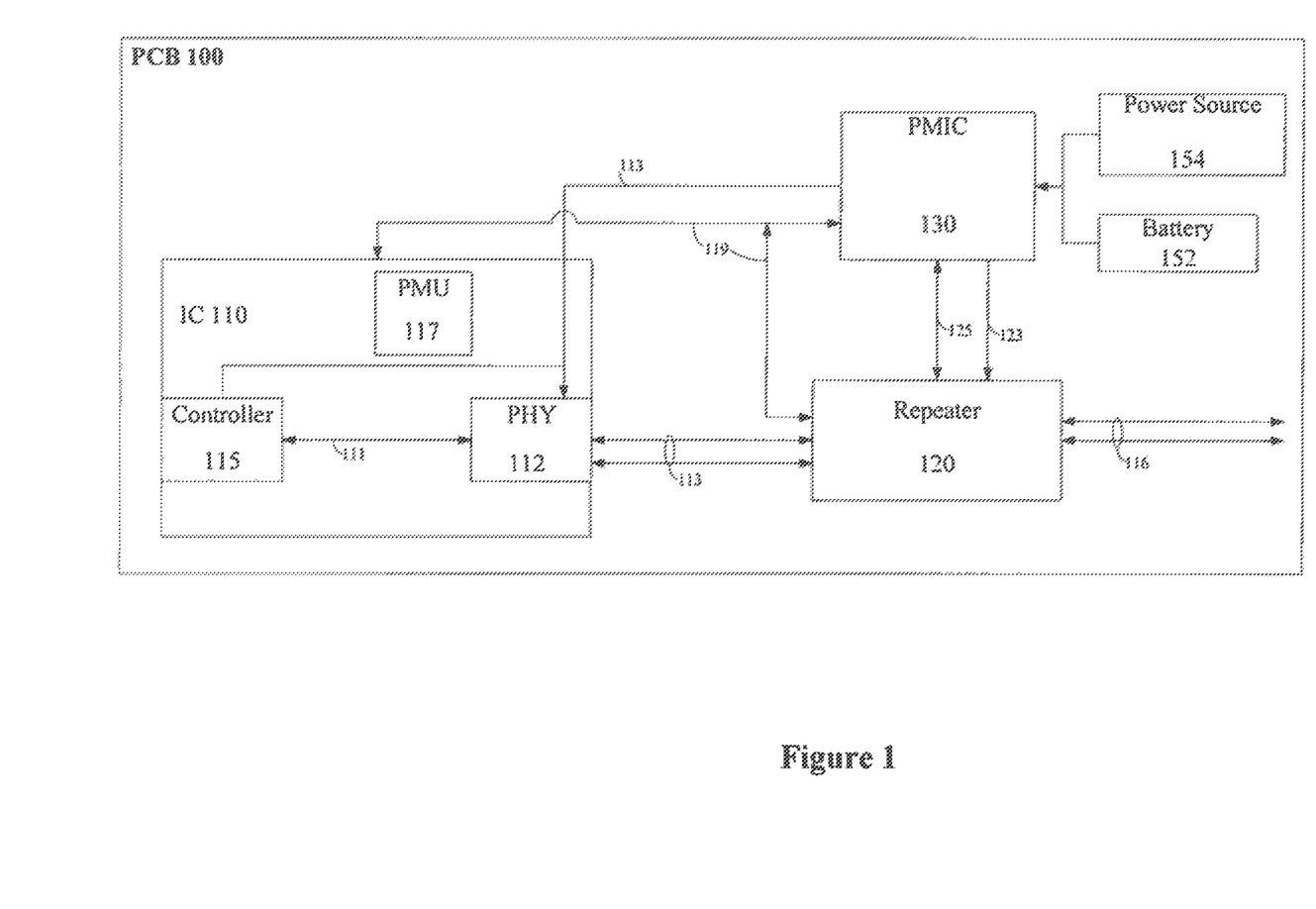
FIG. 1 is a block diagram illustrating one embodiment of a universal serial bus architecture.

FIG. 1 is a block diagram illustrating one embodiment of a universal serial bus architecture to enable low power operation. The eUSB2 architecture may be used in any suitable electronic device, including desktop computers, laptop computers, tablets, and mobile phones, among others. The eUSB2 architecture may be implemented on a printed circuit board (PCB) 100. PCB 100 includes an integrated circuit (IC) 110, a communicating receiver/re-driver (repeater) 120, a power management multi-channel IC (PMIC) 130 and charger 150.

In one embodiment, IC 110 is a SOC that integrates all components of a computer or other electronic system. IC 110 includes a communicating physical layer (PHY) 112 unique to a eUSB2 architecture. In one embodiment, PHY 112 interfaces with a link layer component, such a controller 115, via an interface 111. In such an embodiment, interface 111 may be implemented as a USB 2.0 Transceiver Macrocell Interface (UTMI), and UTMI with extensions (UTMI+), among others.

PHY 112 may include eUSB2 data lines 113 (e.g., eD+ and eD−) that are used to transmit signals between an upstream port and a downstream port. Depending on the particular operating mode, PHY 112 is configured to transmit data on the data lines 113 using differential signaling, single ended digital communications, or some combination thereof. For example, while operating in high speed, differential signaling may be used to transmit data, while single-ended digital communications may be used to transmit control signals. While operating in low speed or full speed, single-ended digital communications may be used to transmit data and control signals. The functions and behaviors of eD− and eD+ may vary depending on the data rate of the device. According to one embodiment, PHY 112 includes both a Low-Speed/Full-Speed (LS/FS) transceiver and a High-Speed (HS) transceiver (not shown) coupled to data lines 113, and controlled by a controller 115 via interface 111.

Repeater 120 communicates with PHY 112 via signals 113, and handles high voltage operation during a classical speed mode of operation, and operates as a re-driver during high speed operation. In embodiments, a device port (not shown) will have an eUSB interface with a physical layer substantially similar to PHY 112. In such embodiments, both the host and device use a communicating transceiver and communicated repeater or re-driver. For instance, the host and device may be implemented using the eUSB protocol. In a further embodiment, the device port may be a standard USB2 port with a standard USB2 physical layer. In such an embodiment, repeater 120 may be used to translate the eUSB signals sent from the host to standard USB2 signals. For example, repeater 120 may translate signals, such as device connect, device disconnect, data rate negotiation, and the like. Repeater 120 may also be used to recondition the voltages of the eUSB signals to the voltages used in standard USB2. Repeater 120 may include a pair of USB2 data lines 116 (e.g., D+ and D−) that are also used to transmit signals between an upstream port and a downstream port.

According to one embodiment, PMIC 130 is included to provide power to PHY 112 and repeater 120 during an active state and to perform power gating by shutting off power to PHY 112 and repeater 120 upon entering a low power state. In a further embodiment, the low power state is entered upon detection of no device activity (e.g., suspend state) or of a port disconnect. Subsequently, PMIC 130 awakens PHY 112 and repeater 120 upon detecting a wake operation. In one embodiment, PMIC 130 receives a power source from a battery 152 or external power source 154 and provides power to PHY 112 and repeater 120 via power interfaces 113 and 123, respectively. Further, PMIC 130 is coupled to PHY 112 and repeater 120 via an Inter-Integrated Circuit (I²C), or Improved Inter-Integrated Circuit (I3C) interface to restore configuration during the wake operation.

Figure 2:
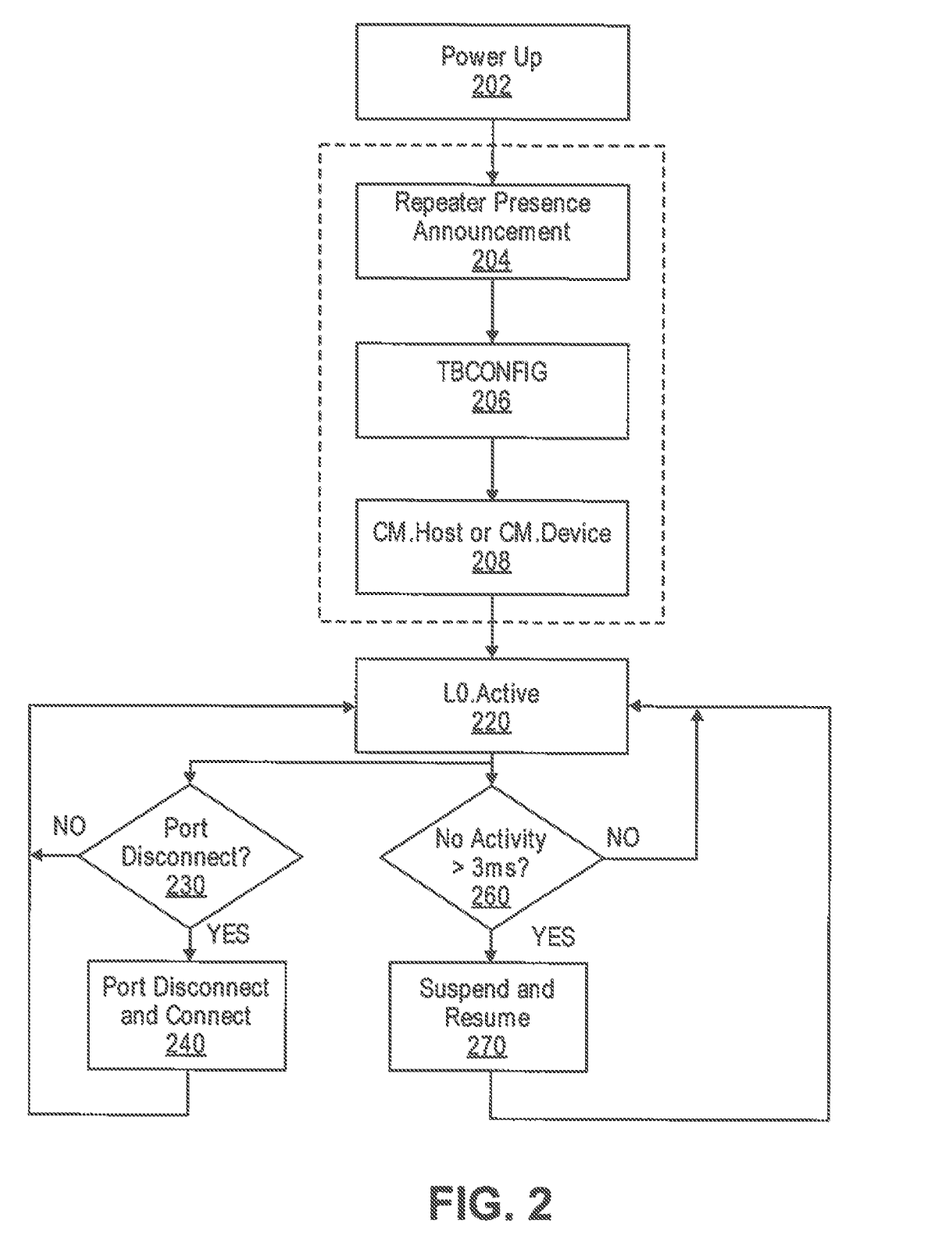
FIG. 2 is a flow diagram illustrating one embodiment of a process for enabling low power operation for a eUSB2.

FIG. 2 is a flow diagram illustrating one embodiment of a process for enabling low power operation for eUSB2 to perform a suspend state and subsequent wake operation. At processing block 202, PHY 112 and repeater 120 are powered up. At processing block 210, a configuration process is performed. The configuration process includes repeater 120 announcing its presence to PHY 112 (processing block 204), PHY 112 transmitting a top down configuration (TBCONFIG) (e.g., host/device indication) to repeater 120 from PMIC 130) (processing block 206), and PHY 112 transmitting a message to repeater 120 to configure in a host/device mode.

Upon completion of the configuration process, PHY 112 enters an active state (L0.Active) and enables a detector (not shown) for port disconnect and suspend, processing block 220. During the active state a determination is made as to whether a port disconnect has been detected, decision block 230, or whether no activity has been detected at data lines 116 (D+/D−) for a predetermined threshold period (e.g., 3 ms) (link idle state), decision block 260. Upon a determination that a port disconnect has occurred, a port disconnect and connect routine is performed, processing block 240.

Figure 3:
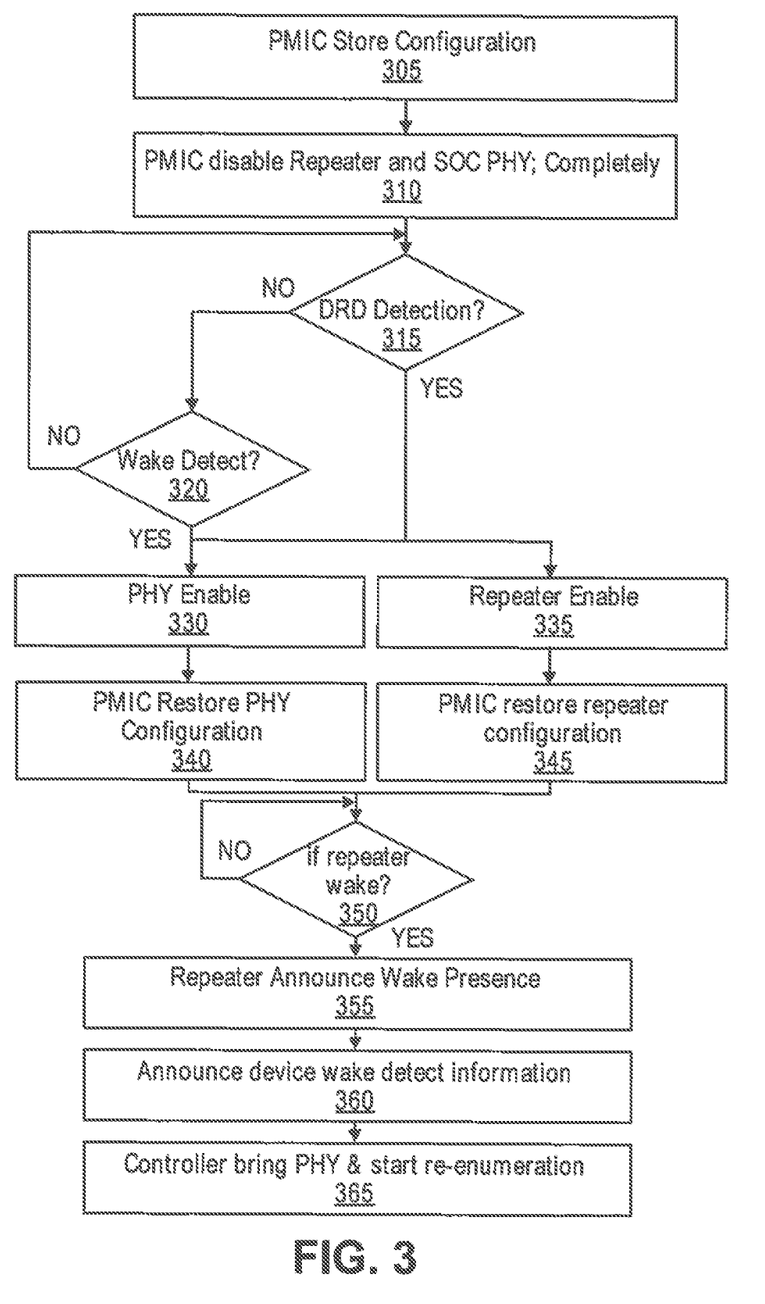
FIG. 3 is a flow diagram illustrating one embodiment of operation during a port connect and disconnect.

FIG. 3 is a flow diagram illustrating one embodiment of a port connect and disconnect routine. Upon detection of a port disconnect, PMIC 130 stores the configuration of PHY 112 and repeater 120 at an internal register, processing block 305. At processing block 310, PMIC 130 disables the PHY 112 and repeater 120 supplies (e.g., interfaces 113 and 123). At this point, eUSB operation has been discontinued. However, PMIC 130 continues to poll a wake detect pin at an interface 125 coupled between PMIC 130 and repeater 120 to determine if a wake operation is to be performed. In a further embodiment, interface 125 also includes a voltage bus that may be implemented for dual role device (DRD) detection.

At decision block 315, PMIC 130 determines whether there has been a DRD detection. If so, PMIC 130 enables PHY 112 and repeater 120 power supply, thus enabling PHY 112, processing block 330, and repeater 120, processing block 335. Subsequently, PMIC 130 transmits configuration information via interface 119 to restore PHY 112, processing block 340, and repeater 120, processing block 345. If at decision block 315 there has been no DRD detection, PMIC 130 determines whether a wake detect signal has been received from repeater 120, decision block 320. If not, control is returned to decision block 315 where it is again determined whether there has been a DRD detection. However if a wake detect has occurred, the processes of 330-345 are repeated. In an alternative embodiment, repeater 120 may perform the wake detect at decision block 320.

At decision block 350, a determination is made as to whether repeater 120 is awake. If so, repeater 120 begins to detect device presence, processing block 355. In addition, repeater 120 announces its presence to PHY 112. At processing block 360, repeater 120 transmits a wake indication to PHY 112. At processing block 365, PHY 112 provides an indication to controller 115 regarding a device connect, and controller 115 begins to perform enumerations. Subsequently, control is returned to processing block 220 (FIG. 2) where PHY 112 returns to the active state.

Figure 4:
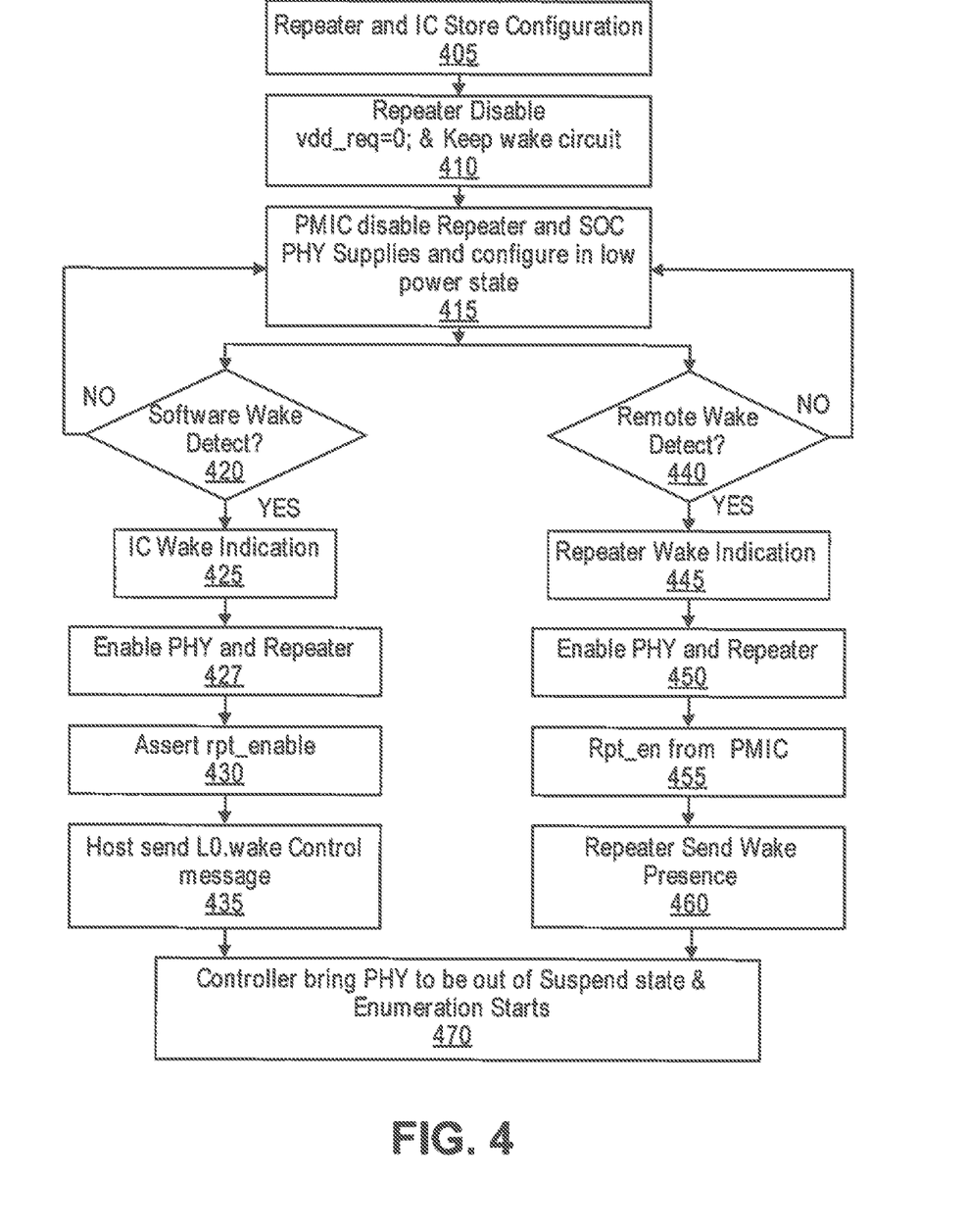
FIG. 4 is a flow diagram illustrating one embodiment of operation during a suspend state and resume.

Upon a determination during the active state of a link idle state (e.g., decision block 260), a suspend and resume routine is performed, processing block 270. FIG. 4 is a flow diagram illustrating one embodiment of a suspend and resume routine. Upon detection of the link idle state repeater 120 transmits the idle state to PHY 112, which forwards to controller 115. Subsequently, controller 115 begins the suspend state, resulting in PHY 112 transmitting a suspend controller message to repeater 120. At processing block 405, IC 120 and repeater 120 store their respective configuration information. At processing block 410, repeater 120 requests PMIC 130 to disable its power supply. At processing block 415, PMIC 130 disables the PHY 112 and repeater 120 supplies. At this point, eUSB operation has been discontinued.

Subsequently, a determination is made as to whether operation is to resume. Decision block 420 determines whether a software wake detect has been received. If so, power management unit (PMU) 117 at IC 110 transmits a wake indication to PMIC 130, processing block 425. In one embodiment, PMU 117 interacts with PMIC 130 to control IC 120 power. At processing block 427, PMIC 130 enables the PHY 112 and repeater 120 power supply. At processing block 430, PMIC 130 asserts a rpt_enable signal 123 to repeater 120 and configures in an un-gated domain. At processing block 435, PHY 112 transmits an active state (L0) wake indication control message to repeater 120 to indicate a software driven resume. At processing block 470, controller 115 brings PHY 112 out of the suspend state and begins enumeration.

Decision block 440 determines whether a remote wake detect has been received. If so, repeater 120 transmits a wake_det signal on interface 125 to PMIC 130, processing block 445. At processing block 427, PMIC 130 enables the PHY 112 and repeater 120 power supply. At processing block 455, PMIC 130 asserts the rpt_enable signal 123 to repeater 120. At processing block 460, repeater 120 transmits a wake presence. At processing block 470, controller 115 brings PHY 112 out of the suspend state and begins enumeration.

The above-described mechanism provides a low power solution that significantly reduces power and improves latency during a suspend-resume state and port disconnect.

Figure 5:
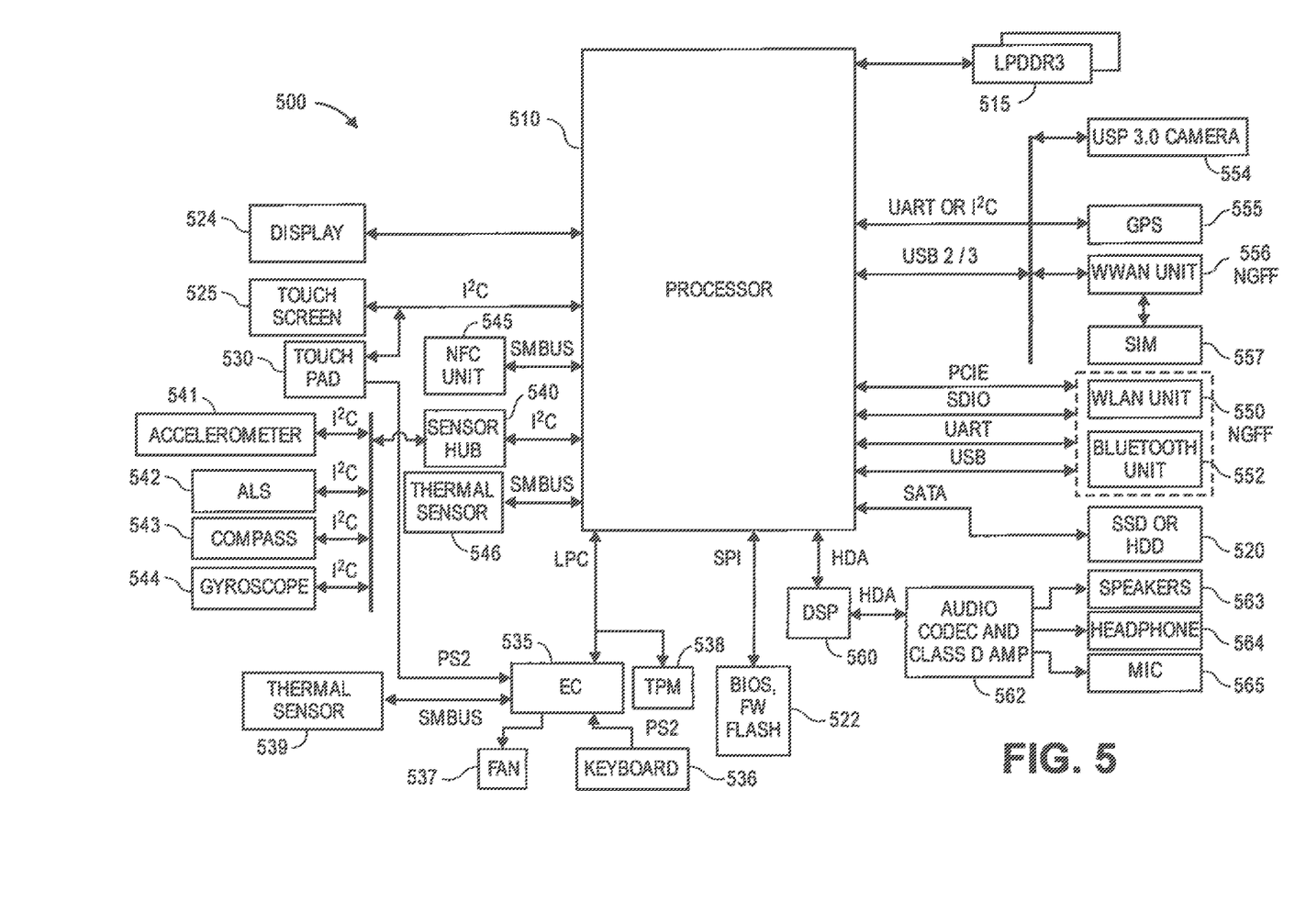
FIG. 5 is a block diagram illustrating one embodiment of a computer system.

FIG. 5 is a block diagram illustrating one embodiment of a computer system in which PCB 100 may be implemented. As shown in FIG. 5, system 500 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 5 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 5, a processor 510, in one embodiment, includes a microprocessor, multi-core processor, multi-threaded processor, an ultra low voltage processor, an embedded processor, or other known processing element. In the illustrated implementation, processor 510 acts as a main processing unit and central hub for communication with many of the various components of the system 500. As one example, processor 500 is implemented as a system on a chip (SoC). As a specific illustrative example, processor 510 includes an Intel® Architecture Core™-based processor such as an i3, i5, i7 or another such processor available from Intel Corporation, Santa Clara, Calif. However, other low power processors such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or Ti OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 510 in one implementation will be discussed further below to provide an illustrative example.

Processor 510, in one embodiment, communicates with a system memory 515. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 6009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other embodiments may feature other memory Implementations, such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 520 may also couple to processor 510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 5, a flash device 522 may be coupled to processor 510, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 500. Specifically shown in the embodiment of FIG. 5 is a display 524 which may be a high definition LCD or LED panel configured within a lid portion of the chassis. This display panel may also provide for a touch screen 525, e.g., adapted externally over the display panel such that via a user's interaction with this touch screen, user inputs can be provided to the system to enable desired operations, e.g., with regard to the display of information, accessing of information and so forth. In one embodiment, display 524 may be coupled to processor 510 via a display interconnect that can be implemented as a high performance graphics interconnect. Touch screen 525 may be coupled to processor 510 via another interconnect, which in an embodiment can be an I2C interconnect. As further shown in FIG. 5, in addition to touch screen 525, user input by way of touch can also occur via a touch pad 530 which may be configured within the chassis and may also be coupled to the same I2C interconnect as touch screen 525.

The display panel may operate in multiple modes. In a first mode, the display panel can be arranged in a transparent state in which the display panel is transparent to visible light. In various embodiments, the majority of the display panel may be a display except for a bezel around the periphery.

When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multitouch panel that is multi-touch capacitive and being at least 5 finger capable. And in some embodiments, the display may be 10 finger capable. In one embodiment, the touch screen is accommodated within a damage and scratch resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 600 ms (lag on finger to pointer). The display, in some implementations, supports edge-to-edge glass with a minimal screen bezel that is also flush with the panel surface, and limited 10 interference when using multi touch.

For perceptual computing and other purposes, various sensors may be present within the system and may be coupled to processor 510 in different manners. Certain inertial and environmental sensors may couple to processor 510 through a sensor hub 540, e.g., via an I2C interconnect. In the embodiment shown in FIG. 5, these sensors may include an accelerometer 541, an ambient light sensor (ALS) 142, a compass 543 and a gyroscope 544. Other environmental sensors may include one or more thermal sensors 546 which in some embodiments couple to processor 510 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 5, various peripheral devices may couple to processor 510 via a low pin count (LPC) interconnect. In the embodiment shown, various components can be coupled through an embedded controller 535. Such components can include a keyboard 536 (e.g., coupled via a PS2 interface), a fan 537, and a thermal sensor 539. In some embodiments, touch pad 530 may also couple to EC 135 via a PS2 interface. In addition, a security processor such as a trusted platform module (TPM) 538 in accordance with the Trusted Computing Group (TCG) TPM Specification Version 1.2, dated Oct. 2, 6003, may also couple to processor 1210 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.0 Specification (November 6008), with at least one powered for charging of USB devices (such as smart-phones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 500 can communicate with external devices in a variety of manners, including wirelessly. In the embodiment shown in FIG. 5, various wireless modules, each of which can correspond to a radio configured for a particular wireless communication protocol, are present. One manner for wireless communication in a short range such as a near field may be via a near field communication (NFC) unit 545 which may communicate, in one embodiment with processor 1210 via an SMBus. Note that via this NFC unit 545, devices in close proximity to each other can communicate. For example, a user can enable system 500 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 5, additional wireless units can include other short range wireless engines including a WLAN units and a Bluetooth unit 552. Using WLAN unit 1250, Wi-Fi™ communications in accordance with a given Institute of Electrical and Electronics Engineers (IEEE) 802.11 standard can be realized, while via Bluetooth unit 552, short range communications via a Bluetooth protocol can occur. These units may communicate with processor 510 via, e.g., a USB link or a universal asynchronous receiver transmitter (UART) link. Or these units may couple to processor 510 via an interconnect according to a Peripheral Component Interconnect Express™ (PCIe™) protocol, e.g., in accordance with the PCI Express™ Specification Base Specification version 3.0 (published Jan. 17, 6007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 556 which in turn may couple to a subscriber identity module (SIM) 557. In addition, to enable receipt and use of location information, a GPS module 555 may also be present. Note that in the embodiment shown in FIG. 5, WWAN unit 556 and an integrated capture device such as a camera module 554 may communicate via a given USB protocol such as a USB 2.0 or 3.0 link, or a UART or I2C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 560, which may couple to processor 510 via a high definition audio (HDA) link. Similarly, DSP 560 may communicate with an integrated coder/decoder (CODEC) and amplifier 562 that in turn may couple to output speakers 563 which may be implemented within the chassis. Similarly, amplifier and CODEC 562 can be coupled to receive audio inputs from a microphone 565 which in an embodiment can be implemented via dual array microphones (such as a digital microphone array) to provide for high quality audio inputs to enable voice-activated control of various operations within the system. Note also that audio outputs can be provided from amplifier/CODEC 562 to a headphone jack 564. Although shown with these particular components in the embodiment of FIG. 5, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

some embodiments, processor 510 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 535. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 535 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 5, understand the scope of the present disclosure is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 6:
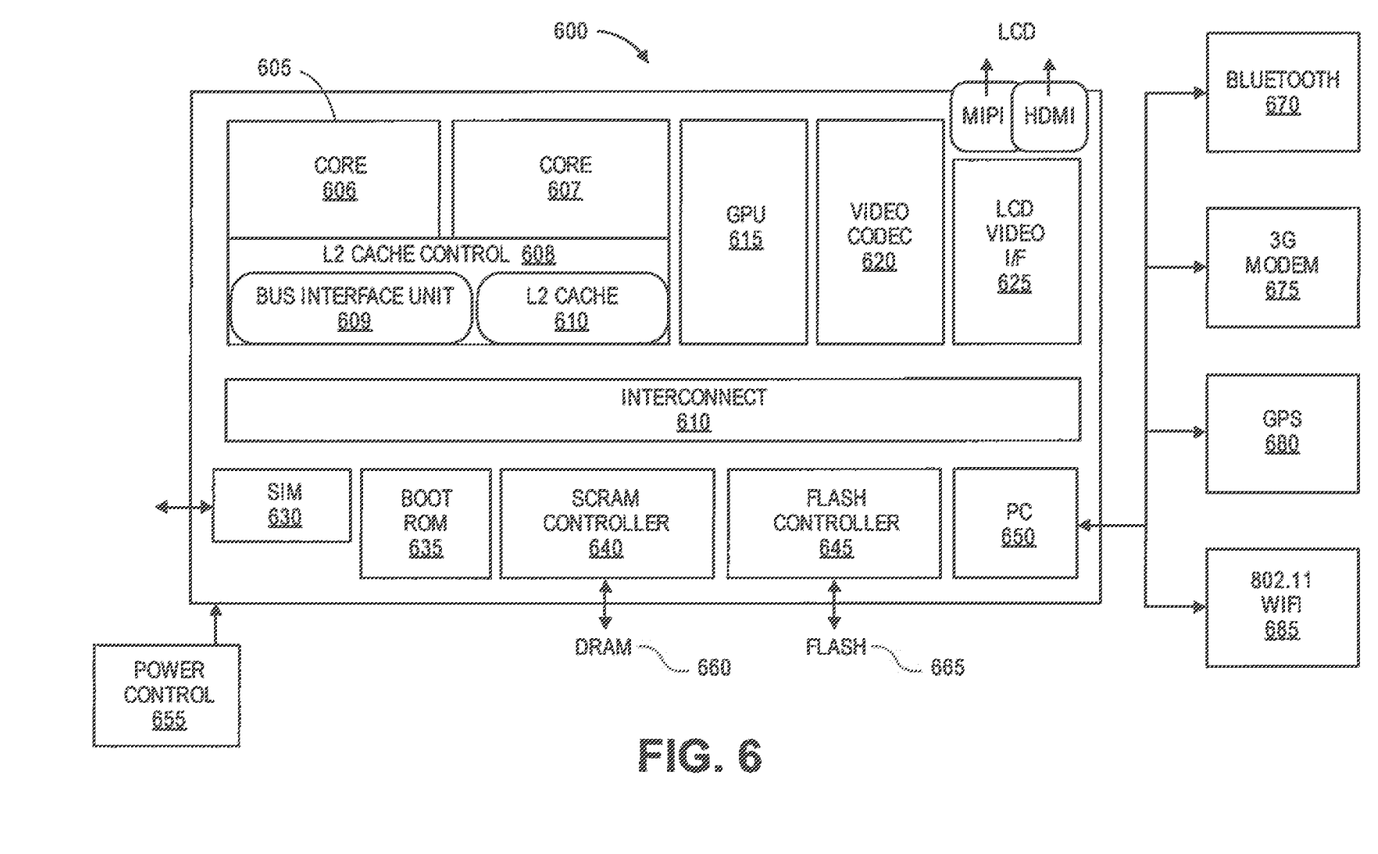
FIG. 6 is a block diagram illustrating another embodiment of a computer system.

Turning next to FIG. 6, another block diagram for an example computing system in accordance with certain embodiments is shown. As a specific illustrative example, SoC 600 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 600 includes 2 cores—606 and 607. Similar to the discussion above, cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache control 608 that is associated with bus interface unit 609 and L2 cache 610 to communicate with other parts of system 600. Interconnect 610 includes an on-chip interconnect, such as an IOSF, AMBA, or other interconnect discussed above, which potentially implements one or more aspects of the described disclosure.

Interface 610 provides communication channels to the other components, such as a Subscriber Identity Module (SIM) 630 to interface with a SIM card, a boot rom 635 to hold boot code for execution by cores 1306 and 1307 to initialize and boot SoC 600, a SDRAM controller 640 to interface with external memory (e.g. DRAM 660), a flash controller 645 to interface with non-volatile memory (e.g. Flash 665), a peripheral control Q1650 (e.g. Serial Peripheral Interface) to interface with peripherals, video codecs 620 and Video interface 625 to display and receive input (e.g. touch enabled input), GPU 615 to perform graphics related computations, etc. Any of these interfaces may incorporate aspects of the disclosure described herein.

In addition, the system illustrates peripherals for communication, such as a Bluetooth module 670, 3G modem 1375, GPS 680, and WiFi 685. Note as stated above, a UE includes a radio for communication. As a result, these peripheral communication modules are not all required. However, in a UE some form of a radio for external communication is to be included.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a Universal Serial Bus 2.0 (USB2) device, comprising an integrated circuit (IC) having a physical layer to send and receive data on a pair of signal lines, a repeater communicatively coupled to the physical layer via the pair of signal lines, and having a port to send and receive data on a second pair of signal lines and a power management unit to provide power to the physical layer and the repeater during an active state and to gate power to the physical layer and the repeater during a low power state.

Example 2 includes the subject matter of Example 1, wherein the power management unit gates power to the physical layer and the repeater upon entrance of the low power state while operating in the active state.

Example 3 includes the subject matter of Examples 1 and 2, wherein the low power state is entered upon the repeater detecting a port disconnect, and wherein the power management stores a physical layer configuration and a repeater configuration, and disables the physical layer and the repeater upon detecting the port disconnect.

Example 4 includes the subject matter of Examples 1-3, wherein the power management unit polls the repeater for a wake detect during the low power state.

Example 5 includes the subject matter of Examples 1-4, wherein the power management unit enables the physical layer and the repeater, and restores the physical layer configuration and the repeater configuration upon receiving a wake detect indicating a device has been connected.

Example 6 includes the subject matter of Examples 1-5, wherein the repeater announces a presence to the physical layer.

Example 7 includes the subject matter of Examples 1-6, wherein the IC further comprises a controller, wherein the physical layer provides an indication to the controller that the device has been connected.

Example 8 includes the subject matter of Examples 1-7, wherein the power management detects a duel roll device during the low power state.

Example 9 includes the subject matter of Examples 1-8, wherein the low power state is entered upon the repeater detecting a link idle state.

Example 10 includes the subject matter of Examples 1-9, wherein the power management unit disables the physical layer and the repeater upon detecting the port link idle state.

Example 11 includes the subject matter of Examples 1-10, wherein prior to being disabled the repeater stores configuration information and the physical layer stores configuration information.

Example 12 includes the subject matter of Examples 1-11, wherein the power management unit receives a wake indication upon a detection of a remote wake detect at the repeater and enables the physical layer and the repeater upon receiving the wake indication.

Example 13 includes the subject matter of Examples 1-12, wherein the power management unit receives a wake indication upon detection of a remote wake detect at the repeater and enables the physical layer and the repeater upon receiving the wake indication.

Some embodiments pertain to Example 14 that includes a power management unit providing power to a physical layer and a repeater during an active state and the power management unit gating power to the physical layer and the repeater upon entrance of the low power state while operating in the active state.

Example 15 includes the subject matter of Example 14, wherein the low power state is entered upon the repeater detecting a port disconnect.

Example 16 includes the subject matter of Examples 14 and 15, further comprising the power management storing a physical layer configuration and a repeater configuration detecting the port disconnect and power management disabling the physical layer and the repeater.

Example 17 includes the subject matter of Examples 14-16, further comprising the power management polling the repeater for a wake detect indicating a device has been connected during the low power state, enabling the physical layer and the repeater upon receiving the wake detect and restoring the physical layer configuration and the repeater configuration.

Example 18 includes the subject matter of Examples 14-17, further comprising the repeater announcing a presence to the physical layer.

Example 19 includes the subject matter of Examples 14-18, further comprising the physical layer providing an indication to the controller that the device has been connected.

Example 20 includes the subject matter of Examples 14-19, wherein the low power state is entered upon the repeater detecting a link idle state.

Example 21 includes the subject matter of Examples 14-20, further comprising the repeater storing configuration information, the physical layer storing configuration information and the power management unit disabling the physical layer and the repeater.

Example 22 includes the subject matter of Examples 14-21, further comprising the power management unit receiving a wake indication upon detection of a software wake detect and the power management unit enabling the physical layer and the repeater upon receiving the wake indication.

Example 23 includes the subject matter of Examples 14-22, further comprising the power management unit and receiving a wake indication upon a detection of a remote wake detect at the repeater and the power management unit enabling the physical layer and the repeater upon receiving the wake indication.

Example 24 includes the subject matter of Examples 14-23, further comprising the repeater transmitting a wake presence.

Example 25 includes the subject matter of Examples 14-24, further comprising a controller bringing the physical layer out of a suspend state.

Although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A Universal Serial Bus 2.0 (USB2) device, comprising:
an integrated circuit (IC) having a physical layer to send and receive data on a pair of signal lines;
a repeater communicatively coupled to the physical layer via the pair of signal lines, and having a port to send and receive data on a second pair of signal lines; and
a power management unit to provide power to the physical layer and the repeater during an active state after the physical layer and the repeater perform a configuration process that includes the repeater announcing its presence to the physical layer and both the repeater and the physical layer performing a top down configuration and to gate power to the physical layer and the repeater during a low power state from which the repeater and physical layer exit in response to a wake detect or a detection of a dual role device (DRD).

2. The device of claim 1, wherein the power management unit gates power to the physical layer and the repeater upon entrance to the low power state while operating in the active state.

3. The device of claim 2, wherein the low power state is entered upon the repeater detecting a port disconnect, and wherein the power management stores a physical layer configuration and a repeater configuration, and disables the physical layer and the repeater upon detecting the port disconnect.

4. The device of claim 3, wherein the power management unit polls the repeater for a wake detect during the low power state.

5. The device of claim 4, wherein the power management unit enables the physical layer and the repeater, and restores the physical layer configuration and the repeater configuration upon receiving a wake detect indicating a device has been connected.

6. The device of claim 5, wherein the repeater announces a presence to the physical layer.

7. The device of claim 6, wherein the IC further comprises a controller, wherein the physical layer provides an indication to the controller that the device has been connected.

8. The device of claim 7, wherein the power management detects a duel roll device during the low power state.

9. The device of claim 2, wherein the low power state is entered upon the repeater detecting a link idle state.

10. The device of claim 9, wherein the power management unit disables the physical layer and the repeater upon detecting the port link idle state.

11. The device of claim 10, wherein prior to being disabled the repeater stores configuration information and the physical layer stores configuration information.

12. The device of claim 11, wherein the power management unit receives a wake indication upon a detection of a remote wake detect at the repeater and enables the physical layer and the repeater upon receiving the wake indication.

13. The device of claim 11, wherein the power management unit receives a wake indication upon detection of a remote wake detect at the repeater and enables the physical layer and the repeater upon receiving the wake indication.

14. A method, comprising:
a power management unit providing power to a physical layer and a repeater during an active state after the physical layer and the repeater perform a configuration process that includes the repeater announcing its presence to the physical layer and both the repeater and the physical layer performing a top down configuration;
the power management unit gating power to the physical layer and the repeater upon entrance of the low power state while operating in the active state; and
the repeater and physical layer exiting the low power state in response to a wake detect or a detection of a dual role device (DRD).

15. The method of claim 14, wherein the low power state is entered upon the repeater detecting a port disconnect.

16. The method of claim 15, further comprising:
the power management storing a physical layer configuration and a repeater configuration detecting the port disconnect; and
power management disabling the physical layer and the repeater upon entering the lower power state.

17. The method of claim 16, further comprising:
the power management polling the repeater for a wake detect indicating a device has been connected during the low power state;
enabling the physical layer and the repeater upon receiving the wake detect; and
restoring the physical layer configuration and the repeater configuration.

18. The method of claim 17 further comprising the repeater announcing a presence to the physical layer.

19. The method of claim 18, further comprising the physical layer providing an indication to the controller that the device has been connected.

20. The method of claim 14, wherein the low power state is entered upon the repeater detecting a link idle state.

21. The method of claim 20, further comprising:
the repeater storing configuration information; and
the physical layer storing configuration information; and
the power management unit disabling the physical layer and the repeater.

22. The method of claim 21, further comprising:
the power management unit receiving a wake indication upon detection of a software wake detect;
the power management unit enabling the physical layer and the repeater upon receiving the wake indication.

23. The method of claim 21, further comprising:
the power management unit and receiving a wake indication upon a detection of a remote wake detect at the repeater;
the power management unit enabling the physical layer and the repeater upon receiving the wake indication.

24. The method of claim 23, further comprising the repeater transmitting a wake presence.

25. The method of claim 24, further comprising a controller bringing the physical layer out of a suspend state.

* * * * *